United States Patent
Shaw

(10) Patent No.: US 9,488,789 B1
(45) Date of Patent: Nov. 8, 2016

(54) ELECTRO-OPTIC DEVICE WITH DICHROIC MIRROR AND RELATED METHODS

(71) Applicant: STMICROELECTRONICS S.r.l., Agrate Brianza (IT)

(72) Inventor: Mark Andrew Shaw, Milan (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 0 days.

(21) Appl. No.: 14/722,565

(22) Filed: May 27, 2015

(51) Int. Cl.
  *G02B 6/42*  (2006.01)
  *G02B 6/34*  (2006.01)
  *G02B 6/124* (2006.01)
  *G02B 6/30*  (2006.01)
  *G02B 6/32*  (2006.01)
  *G02B 27/14* (2006.01)

(52) U.S. Cl.
  CPC ........... *G02B 6/4214* (2013.01); *G02B 6/124* (2013.01); *G02B 6/30* (2013.01); *G02B 6/32* (2013.01); *G02B 6/34* (2013.01); *G02B 6/4253* (2013.01); *G02B 27/141* (2013.01)

(58) Field of Classification Search
  CPC ...... G02B 6/4214; G02B 6/124; G02B 6/30; G02B 6/32; G02B 6/34; G02B 6/4253; G02B 27/141
  See application file for complete search history.

(56) References Cited

U.S. PATENT DOCUMENTS

| | | | | |
|---|---|---|---|---|
| 5,287,424 A | * | 2/1994 | Sheem ................ | G02B 6/2808 264/1.25 |
| 5,902,715 A | * | 5/1999 | Tsukamoto .......... | G02B 6/2551 385/130 |
| 6,017,681 A | * | 1/2000 | Tsukamoto .......... | G02B 6/2551 430/321 |
| 6,081,632 A | * | 6/2000 | Yoshimura ............. | B82Y 20/00 385/122 |
| 6,213,651 B1 | * | 4/2001 | Jiang .................... | G02B 6/4204 385/88 |
| 6,946,785 B2 | * | 9/2005 | Ito .......................... | B82Y 30/00 252/301.4 R |
| 7,014,988 B2 | * | 3/2006 | DeVoe .................. | G02B 6/1221 430/290 |
| 7,166,322 B2 | * | 1/2007 | Inui .................... | B29D 11/00663 427/163.2 |
| 7,194,016 B2 | * | 3/2007 | Bullington ............... | G02B 6/34 372/108 |
| 7,369,725 B2 | * | 5/2008 | Takatori ................. | G02B 6/001 349/62 |
| 7,374,328 B2 | * | 5/2008 | Kuroda ................ | G02B 6/0053 349/112 |
| 7,413,355 B2 | * | 8/2008 | Nishizawa ........... | G02B 6/4246 385/93 |
| 7,553,059 B2 | * | 6/2009 | Kuroda ................ | G02B 6/0053 362/606 |

(Continued)

OTHER PUBLICATIONS

New Products, "4-Channel Optical Transceiver Applying 3-Dimensional Polymeric Waveguide," Find vol. 24, 2006, pp. 1-5.*

(Continued)

*Primary Examiner* — Peter Radkowski
(74) *Attorney, Agent, or Firm* — Allen, Dyer, Doppelt, Milbrath & Gilchrist, P.A.

(57) ABSTRACT

An electro-optic device may include a photonic chip having an optical grating at a surface, and an IC coupled to the photonic chip. The electro-optic device may include an optical element defining an optical path above the optical grating, and a dichroic mirror above the optical grating and aligned with the optical path.

20 Claims, 3 Drawing Sheets

(56) References Cited

U.S. PATENT DOCUMENTS

| | | | | |
|---|---|---|---|---|
| 7,560,055 | B2* | 7/2009 | Inui | G02B 6/138 264/1.24 |
| 7,601,484 | B2* | 10/2009 | DeVoe | G02B 6/1221 430/321 |
| 7,656,472 | B2* | 2/2010 | Takatori | G02B 6/001 345/87 |
| 8,530,118 | B2* | 9/2013 | DeVoe | G02B 6/1221 385/143 |
| 9,252,321 | B2* | 2/2016 | Goto | H01L 31/18 |
| 2004/0165637 | A1* | 8/2004 | Bullington | G02B 6/34 372/50.11 |
| 2004/0212290 | A1* | 10/2004 | Ito | B82Y 30/00 313/479 |
| 2005/0058420 | A1* | 3/2005 | Inui | B29D 11/00663 385/129 |
| 2005/0141823 | A1* | 6/2005 | Han | G02B 6/4204 385/89 |
| 2005/0208431 | A1* | 9/2005 | Devoe | G02B 6/1221 430/321 |
| 2005/0276545 | A1* | 12/2005 | Inui | G02B 6/138 385/88 |
| 2006/0078831 | A1* | 4/2006 | DeVoe | G02B 6/1221 430/321 |
| 2006/0280411 | A1* | 12/2006 | Nishizawa | G02B 6/4246 385/93 |
| 2007/0058388 | A1* | 3/2007 | Takatori | G02B 6/001 362/554 |
| 2007/0236940 | A1* | 10/2007 | Kuroda | G02B 6/0053 362/339 |
| 2008/0055929 | A1* | 3/2008 | Kuroda | G02B 6/0053 362/609 |
| 2008/0108122 | A1* | 5/2008 | Paul | B01F 5/0475 435/183 |
| 2008/0285914 | A1* | 11/2008 | Matsuoka | G02B 6/12007 385/24 |
| 2008/0304791 | A1* | 12/2008 | Takatori | G02B 6/001 385/39 |
| 2010/0027956 | A1* | 2/2010 | DeVoe | G02B 6/1221 385/142 |
| 2010/0098374 | A1* | 4/2010 | Althaus | G02B 6/4214 385/14 |
| 2010/0278484 | A1* | 11/2010 | Scheerlinck | G01M 11/35 385/37 |
| 2012/0120365 | A1* | 5/2012 | Legerton | G02B 27/0172 351/159.02 |
| 2013/0223788 | A1 | 8/2013 | Koos et al. | |
| 2014/0071426 | A1* | 3/2014 | Dunne | G01S 7/481 356/4.01 |
| 2015/0087092 | A1* | 3/2015 | Goto | H01L 31/18 438/27 |

OTHER PUBLICATIONS

Kim et al., "Stacked Polymeric Multimode Waveguide Arrays for Two-Dimensional Optical Interconnects," Journal of Lightwave Technology, vol. 22, No. 3, Mar. 2004, pp. 840-844.*
Ogura et al., "Polysilane-Based 3D Waveguides for Optical Interconnects," Proc. of SPIE, vol. 6891, 2008, pp. 1-11.*
Karp et al., Planar micro-optic solar concentration using multiple imaging lenses into a common slab waveguide, SPIE, San Diego, 2009.*
Jeong, et al., "Biologically Inspired Artificial Compound Eyes," Science 312, 557 (2006).*
Luff et al., "Research Article—Hybrid Silicon Photonics for Low-Cost High-Bandwidth Link Applications," Advances in Optical Technologies, vol. 2008, Mar. 27, 2008, 6 pages.
Barwicz et al., "Assembly of Mechanically Compliant Interfaces Between Optical Fibers and Nanophotonic Chips," IEEE 64th ECTC, May 27-30, 2014, pp. 1-14.
Li et al., "Silicon Photonics Packaging With Lateral Fiber Coupling to Apodized Grating Coupler Embedded Circuit," Optics Express, vol. 22, No. 20, Oct. 6, 2014, pp. 24235-24240.
Han et al., "A Reflective Curved Mirror With Low Coupling Loss for Optical Interconnection," IEEE Photonics Technology Letters, vol. 16, No. 1, Jan. 2004, pp. 185-187.
Hirmatsu et al., "Surface Mount Connectors With Three-Dimensional Waveguide Arrays for Board-to-Board Optical Interconnects," ECOC 2005 Proceedings, vol. 3, pp. 615-616.
Clark et al., "Flexible Polymer Waveguides for Optical Wire Bonds," Journal of Optics A: Pure and Applied Optics, 2002, pp. S224-S227.
Fischer et al., "Topical Review—Unconventional Applications of Wire Bonding Create Opportunities for Microsystem Integration," Journal of Micromechanics and Microengineering 23, 2013, pp. 1-18.
Lindenmann et al., "Broadband Low-Loss Interconnects Enabled by Photonic Wire Bonding," IEEE 2012, pp. 125-126.
Lindenmann et al., "Low-Loss Photonic Wire Bond Interconnects Enabling 5 TBit/s Data Transmission," Optical Society of America, Jan. 23, 2012, pp. 1-3.
Lindenmann et al., "Photonic Wire Bonding for Single-Mode Chip-to-Chip Interconnects," IEEE 2011, pp. 380-382.
Lindenmann et al., "Photonic Waveguide Bonds—A Novel Concept for Chip-to-Chip Interconnects," Optical Society of America, 2011, 3 pages.
Hiramatsu, "Compact Waveguide Array Connectors for Optical Backplane System," Mitsubishi Electric Corporation Advanced Technology R&D Center, Mar. 11, 2009, 2 pages.
Lee et al., "Perpendicular Coupling to In-Plane Photonics Using Arc Waveguides Fabricated Via Two-Photon Polyermization," Applied Physics Letters 100, 2012, 4 pages.
Lamprecht et al., "Integrated Micro-Mirrors for Compact Routing of Optical Polymer Waveguides," LEOS Annua Meeting Conference Proceedings, IEEE 2009, pp. 20-21.
Hiramatsu et al., "Compact Three-Dimensional Waveguide Array Connectors for Extremely High-Definition (EHD) Display System," IEEE Conference Publications, 2006, pp. 1-2.
Zakariya et al., "Flexible Waveguide Coupling Probe for Wafer-Level Optical Characterization of Planar Lightwave Circuits," IEEE 2007, pp. 458-461.
Fujiwara et al., "High Performance Polynorbornene Optical Waveguide for Opto-Electric Interconnections," IEEE Polytronic 2007 Conference, 2007, pp. 193-197.
Hiramatsu, "Optical Backplane Connectors Using Three-Dimensional Waveguide Arrays," Journal of Lightwave Technology, vol. 25, No. 9, Sep. 2007, pp. 2776-2782.
Immonen et al., "Fabrication and Characterization of Polymer Optical Waveguides With Integrated Micromirrors for Three-Dimensional Board-Level Optical Interconnects," IEEE Transactions on Electronics Packaging Manufacturing, vol. 28, No. 4, Oct. 2005, pp. 304-311.
Koos, "Silicon Nanophotonics and Photonic Wire Bonding: Technologies for Multi-Terabit/s Interconnects," Institute of Photonics and Quantum Electronics, Mar. 3, 2012, pp. 1-27.
McLeod et al., "3D Waveguides With Fiber Couples and 90 Degree Bends in Holographic Photopolymer," Proc. of SPIE vol. 6657, 2007, pp. 1-6.
"4-Channel Optical Transceiver Applying 3-Dimensional Polymeric Waveguide," Find vol. 24, 2006, pp. 1-5.
Houbertz et al., "Optoelectronic Printed Circuit Board: 3D Structures Written by Two-Photon Absorption," Proceedings of the SPIE—The International Society for Optical Engineering, v 7053, 2008, pp. 1-13.
Houbertz et al., "Two-Photon Polymerization of Inorganic-Organic Hybrid Polymers as Scalable Technology Using Ultra-Short Laser Pulses," Coherence and Ultrashort Pulse Laser Emission, Dec. 24, 2010, pp. 583-608.
Lindenmann et al., Photonic Wire Bonds for Terabit/s Chip-to-Chip Interconnects, Optics Express 20(16), 2012, p. 1-8.
Hiramatsu et al., "Three-Dimensional Waveguide Arrays for Coupling Between Fiber-Optic Connectors and Surface-Mounted Optoelectronic Devices," Journal of Lightwave Technology, vol. 23, No. 9, Sep. 2005, pp. 2733-2739.
Riester, "Chip-to-Board Interconnects for High-Performance Computing," SPIE Photonics West 8630, Feb. 3, 2013, pp. 1-12.

(56) References Cited

OTHER PUBLICATIONS

Ogura, Polysilane-Based Multi-Layered Waveguide for Optical Interconnect, Techno-Cosmos, vol. 21, Mar. 2008, pp. 15-21.

Stadlmann et al., "Fabrication of Optical Interconnects With Two Photon Polymerization," Proceedings of MPM2010—The 11th International Symposium on Laser Precision Microfabrication, Aug. 24, 2010, pp. 1-6.

Van Steenberge et al., "MT-Compatible Laser-Ablated Interconnections for Optical Printed Circuit Boards," Journal of Lightwave Technology, vol. 22, No. 9, Sep. 2004, pp. 2083-2090.

Schmidt et al., "Two-Photon 3D Lithography: A Versatile Fabrication Method for Complex 3D Shapes and Optical Interconnects Within the Scope of Innovative Industrial Application," JLMN—Journal of Laser Micro/Nanoengineering, vol. 2, No. 3, 2007, pp. 170-177.

Zakariya et al., "Experimental Demonstration of a Wafer-Level Flexible Probe for Optical Waveguide Testing," Optics Express, vol. 15, No. 24, Nov. 26, 2007, pp. 16210-16215.

Itoh et al., "Fabricating Micro-Bragg Reflectors in 3-D Photorefractive Waveguides," Optics Express, vol. 2, No. 12, Jun. 8, 1998, pp. 503-508.

Panepucci et al., "Polymeric Optical Wire-Bonding for Planar Lightwave Circuit Packaging," Conference Paper—Integrated Photonics and Nanophotonics Research and Applications, Jul. 13-16, 2008, 3 pages.

McLeod et al., "Hybrid Integrated Optics in Volume Holographic Photopolymer," Proceedings of SPIE, vol. 5521, 2004, pp. 55-62.

"Skin Tight Electronics," Fraunhofer Vue Microelectronics News 35, Jul. 2009, pp. 1-28.

Houbertz et al., "Hybrid Polymer Optical Waveguides Written by Two-Photon Processing for 3D Interconnects," Opto, Paper 8630-8, Feb. 3, 2013, 23 pages.

Ogura et al., "Polysilane-Bsed 3D Waveguides for Optical Interconnects," Proc. of SPIE, vol. 6891, 2008, pp. 1-11.

Panepucci et al., "Flexible Optical Wire-Bonding for Planar Lightwave Circuits Packaging," Proc. of SPIE, vol. 6645, 2007, pp. 1-8.

\* cited by examiner

ELECTRO-OPTIC DEVICE WITH DICHROIC MIRROR AND RELATED METHODS

TECHNICAL FIELD

The present disclosure relates to the field of photonics, and, more particularly, to an electro-optic device and related methods.

BACKGROUND

Integrated optical devices for directly processing optical signals have become of greater importance as optical fiber communications increasingly replace metallic cable and microwave transmission links. Integrated optical devices can advantageously be implemented as silica optical circuits having compact dimensions at relatively low cost. Silica optical circuits employ integrated waveguide structures formed on silicon substrates.

In some applications, optical gratings are formed in the silicon substrate or chip for input-output of the photonic signal. Typically, the optical grating is formed on a major surface of the silicon substrate. Hence, the photonic signal path extends largely perpendicular to the silicon substrate. When using the silicon substrate in coupling applications, such as when coupling to an optical fiber, the optical fiber must be mounted in near perpendicular fashion. In these applications, the side profile of the coupling device can be quite large, which is generally undesirable. Indeed, since optical fibers have a minimum bending radius, the side profile of the device can be substantially impacted.

SUMMARY

Generally speaking, an electro-optic device may include a photonic chip having an optical grating at a surface thereof, an integrated circuit (IC) coupled to the photonic chip, and an optical element defining an optical path above the optical grating. The electro-optic device may include a dichroic mirror above the optical grating and aligned with the optical path.

In some embodiments, the optical element may comprise an optical fiber extending parallel with the optical grating. In other embodiments, the optical element may comprise a lens, for example, a collimating lens or a focusing lens.

Also, the electro-optic device may further comprise a polymer material encapsulating the optical element and the dichroic mirror. The polymer material may comprise a photopolymer configured to cure responsive to a first wavelength of electromagnetic radiation. The photonic chip may operate at a second wavelength of electromagnetic radiation, and the dichroic mirror may reflect the second wavelength of electromagnetic radiation and transmit the first wavelength of electromagnetic radiation.

In yet other embodiments, the optical element may comprise an optical waveguide having a first surface carrying the dichroic mirror and a second surface defining an optical lens. The optical waveguide may comprise glass material, for example.

Another aspect is directed to a method for making an electro-optic device. The method may include coupling a photonic chip having an optical grating at a surface thereof, and an IC together, positioning an optical element to define an optical path above the optical grating, and positioning a dichroic mirror above the optical grating and aligned with the optical path.

DETAILED DESCRIPTION

Figure 1:
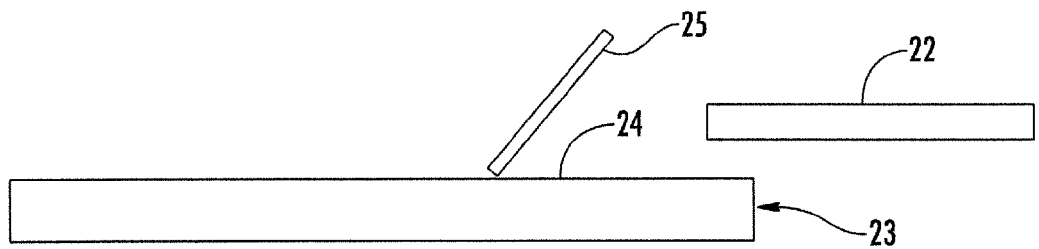
FIGS. 1-2 are schematic side views of an electro-optic device during manufacturing, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2:
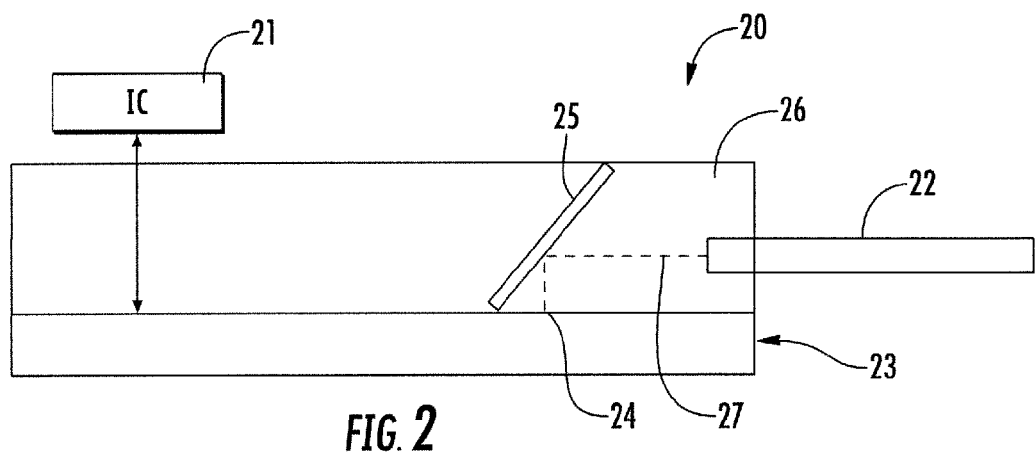

Referring initially to FIGS. 1-2, an electro-optic device 20 illustratively includes a photonic chip 23 having an optical grating (i.e. a diffraction grating) 24 at a surface thereof, and an IC 21 coupled to the photonic chip. The IC 21 may comprise, for example, an electro-optic driver IC. As will be appreciated by the skilled person, the optical grating 24 is formed in a silicon substrate using typical semiconductor fabrication techniques. The photonic chip 23 may comprise a semiconductor substrate, such as a silicon substrate.

The electro-optic device 20 illustratively includes an optical element 22 defining an optical path 27 above the optical grating 24. In the illustrated embodiment, the optical element 22 comprises an optical fiber extending parallel with the optical grating 24. The electro-optic device 20 illustratively includes a dichroic mirror 25 above the optical grating 24 and aligned with the optical path 27. Since the optical grating 24 is on a major surface of the photonic chip 23, the optical path 27 extends largely perpendicular to the major surface (i.e. between 75-90 degrees) and reflects off the dichroic mirror 25.

Also, the electro-optic device 20 illustratively includes a polymer material 26 encapsulating the optical fiber 22 and the dichroic mirror 25. In some embodiments, the polymer material 26 may comprise a photopolymer configured to react to a first wavelength of electromagnetic radiation (e.g. outside the range of 1250-1350 nm). Also, the photonic chip 23 may operate (i.e. be optically transmissive) at a second wavelength of electromagnetic radiation (e.g. 1310 nm, or within the range of 1250-1350 nm), and the dichroic mirror 25 may reflect the second wavelength of electromagnetic radiation and transmit the first wavelength of electromagnetic radiation.

Another aspect is directed to a method for making the electro-optic device 20. The method may include coupling the photonic chip 23 having the optical grating 24 at the surface thereof, and the IC 21 together, positioning the optical element (optical fiber in the illustrated embodiment) 22 to define the optical path 27 above the optical grating, and positioning a dichroic mirror 25 above the optical grating and aligned with the optical path.

In particular, in FIG. 1, the optical fiber 22 and the dichroic mirror 25 are positioned above the photonic chip 23 (e.g. using a carrier substrate and adhesive layers). In FIG. 2, the polymer material 26 is formed to encapsulate the optical fiber 22 and the dichroic mirror 25. The electro-optic device 20 is then irradiated with electromagnetic radiation at the first wavelength, which cures the polymer material 26 and fixes the dichroic mirror 25 and the optical fiber 22 (i.e. a direct write process). Advantageously, because the dichroic mirror 25 transmits the first wavelength of electromagnetic radiation, the entire body of the polymer material is cured, even the portions blocked directly by the dichroic mirror. After curing, the optical path 27 is effected via the dichroic mirror's 25 reflective property for the second wavelength of electromagnetic radiation.

Advantageously, the electro-optic device 20 provides an approach to horizontally coupling the optical fiber 22 with non-active alignment. In typical approaches, direct write manufactured waveguides/lenses required a high contrast between the optical fiber core and cladding to achieve a low bend radius, which may not be possible. This means the overall module height is larger than necessary. Also, in typical approaches where air is used as cladding, the waveguide is exposed and any other encapsulation or environmental contamination (humidity) can alter the optical propagation or reflectivity. With typical approaches that included a mirror, these devices cannot be directly written as the mirror will reflect the laser light used in the writing and the mirror must be attached/deposited afterwards and actively aligned.

Advantageously, the electro-optic device 20 may not need active alignment since the optical waveguides/lens is written with reference to passive (vision recognition) alignment to markers on photonic chip 23. Also, the electro-optic device 20 has a low side profile and avoids dealing with the minimum bending radius for the optical fiber 22. Also, since the dichroic mirror 25 can be encapsulated by the polymer material, the electro-optic device 20 is more mechanically robust than the devices of typical approaches.

Figure 3:
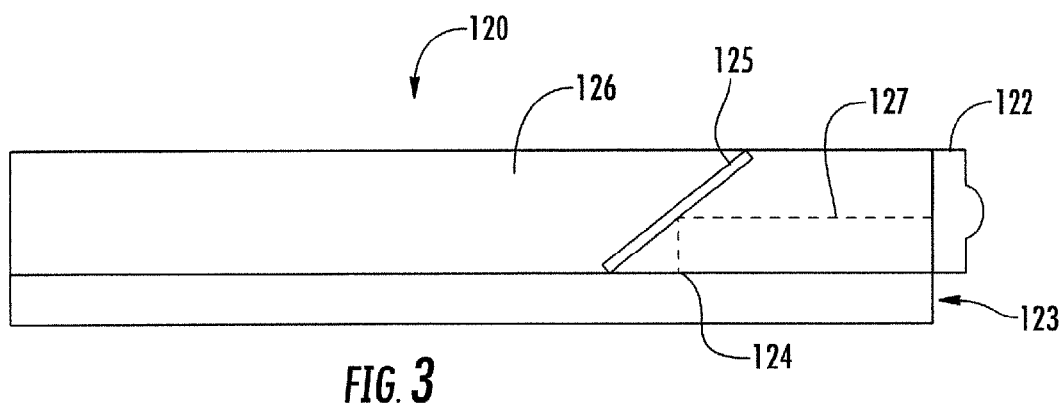
FIG. 3 is a schematic side view of another embodiment of the electro-optic device.

Referring now additionally to FIG. 3, another embodiment of the electro-optic device 20 is now described. In this embodiment of the electro-optic device 20, those elements already discussed above with respect to FIGS. 1-2 are incremented by 100 and most require no further discussion herein. This embodiment differs from the previous embodiment in that this electro-optic device 120 illustratively includes the optical element comprising a window defining a lens 122, i.e. a collimating or a focusing lens. Although the optical fiber 22 of the embodiment of FIGS. 1-2 is omitted for clarity of explanation, the optical fiber can be optically coupled to the output of the lens 122.

Figure 4:
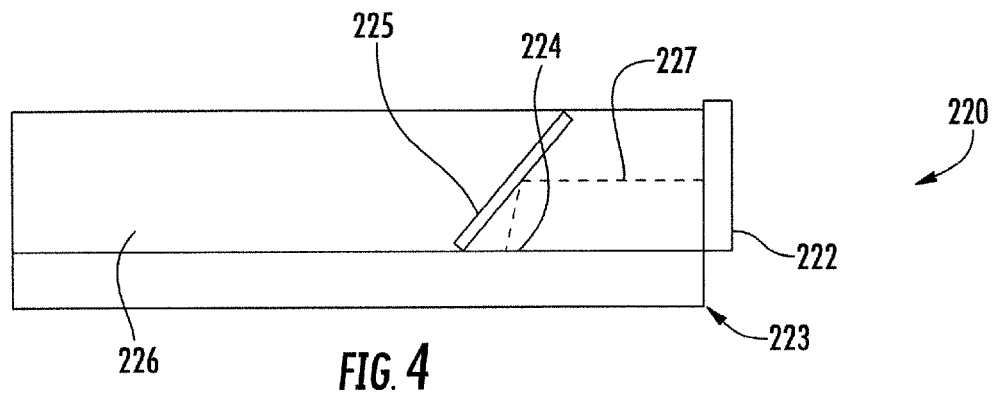
FIG. 4 is a schematic side view of yet another embodiment of the electro-optic device.

Referring now additionally to FIG. 4, another embodiment of the electro-optic device 20 is now described. In this embodiment of the electro-optic device 20, those elements already discussed above with respect to FIGS. 1-2 are incremented by 200 and most require no further discussion herein. This embodiment differs from the previous embodiment in that this electro-optic device 220 illustratively includes the optical element comprising a window 222. Although the optical fiber 22 of the embodiment of FIGS. 1-2 is omitted, the optical fiber can be optically coupled to the output of the window 222.

Figure 5:
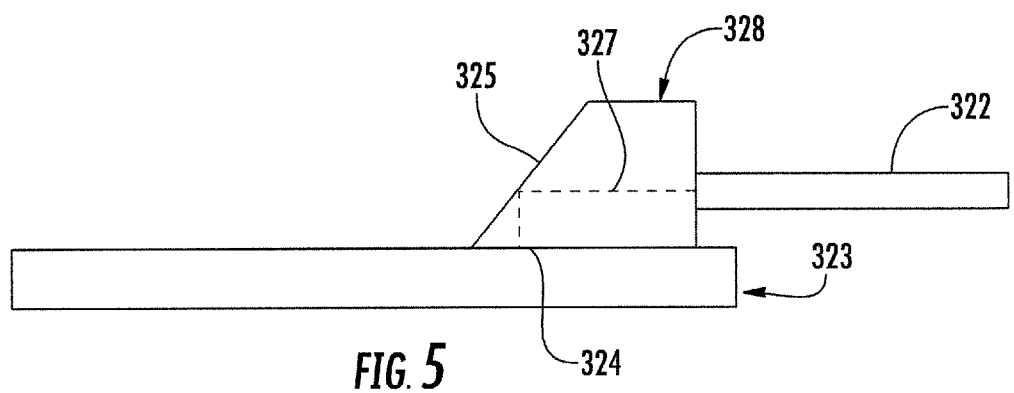
FIG. 5 is a schematic side view of another embodiment of the electro-optic device.

Referring now additionally to FIG. 5, another embodiment of the electro-optic device 20 is now described. In this embodiment of the electro-optic device 20, those elements already discussed above with respect to FIGS. 1-2 are incremented by 300 and most require no further discussion herein. This embodiment differs from the previous embodiment in that this electro-optic device 320 omits the polymer material 26 of the embodiment of FIGS. 1-2. In this embodiment, the optical element comprises an optical fiber 322, and an optical waveguide 328 having a first surface carrying the dichroic mirror 325 and a second surface receiving the optical fiber (in some embodiments, not shown, within a recess). The optical waveguide may comprise glass material, for example. In this embodiment, the optical waveguide 328 is written in situ.

Figure 6:
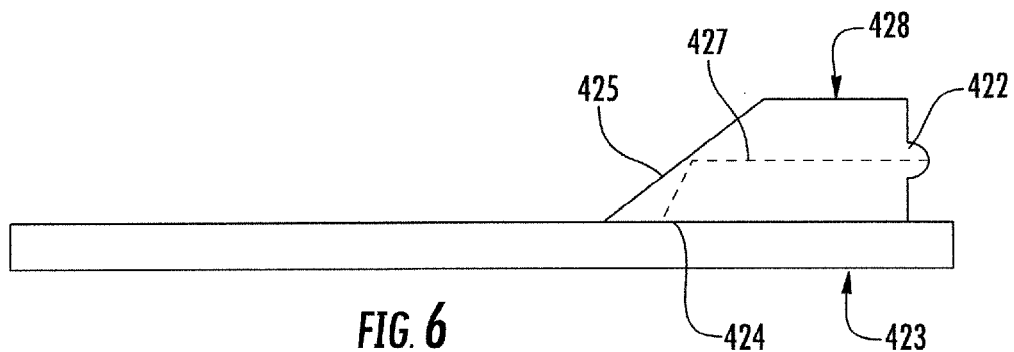
FIG. 6 is a schematic side view of another embodiment of the electro-optic device.

Referring now additionally to FIG. 6, another embodiment of the electro-optic device 20 is now described. In this embodiment of the electro-optic device 20, those elements already discussed above with respect to FIGS. 1-2 are incremented by 400 and most require no further discussion herein. This embodiment differs from the previous embodiment in that this electro-optic device 420 omits the polymer material 26 of the embodiment of FIGS. 1-2. In this embodiment, the optical element comprises an optical waveguide 428 having a first surface carrying the dichroic mirror 425, and a second surface defining an optical lens (e.g. focusing or collimating lens) 422. In this embodiment, the optical waveguide 428 is written in situ.

Figure 7:
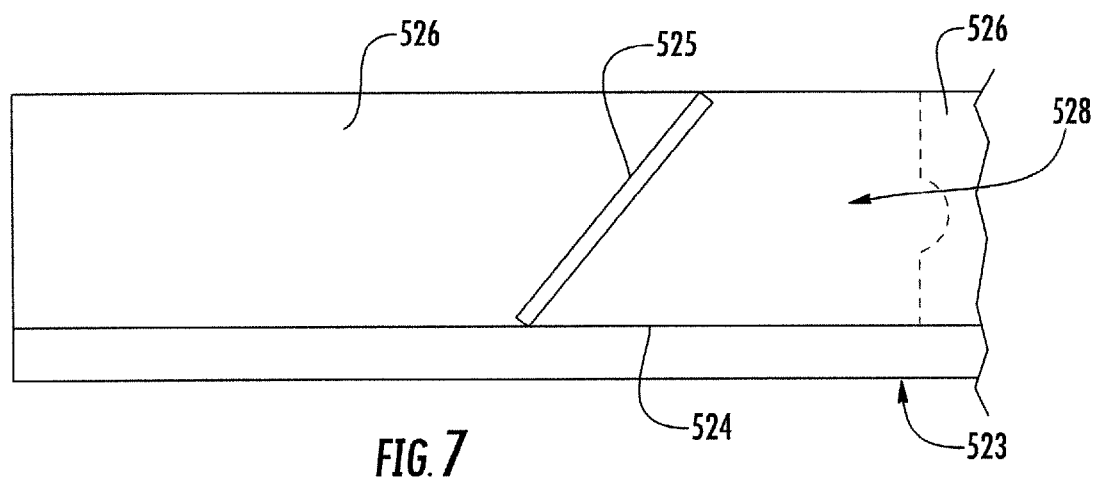
FIGS. 7-8 are schematic side views of another embodiment of the electro-optic device during manufacturing.
Figure 8:
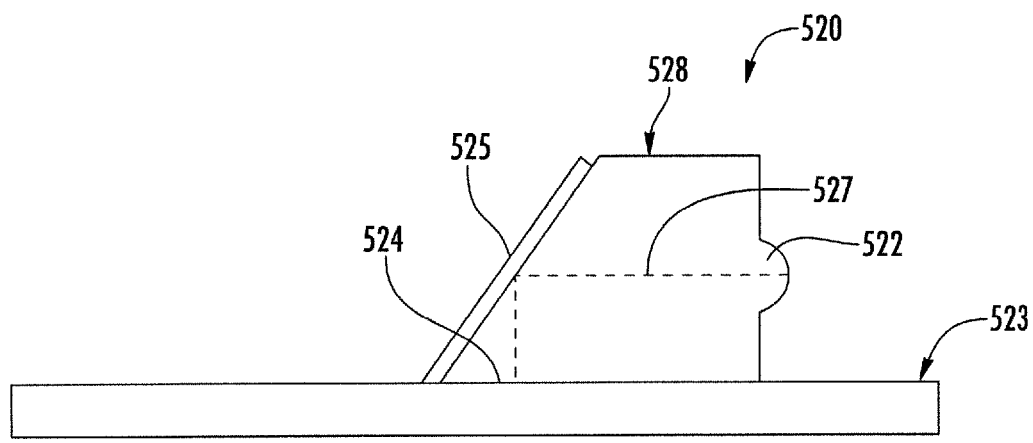

Referring now additionally to FIGS. 7-8, another embodiment of the electro-optic device 20 is now described. In this embodiment of the electro-optic device 20, those elements already discussed above with respect to FIGS. 1-2 are incremented by 500 and most require no further discussion herein. This embodiment differs from the previous embodiment in that this electro-optic device 520 selectively cures the polymer material 526. In particular, the polymer material 526 is selectively (e.g. laser optical source) irradiated/written with electromagnetic radiation at the first wavelength to define an optical waveguide 528. At FIG. 8, the uncured polymer material is removed by applying a solvent, which defines the optical waveguide 528 comprising a lens 522, i.e. a collimating lens.

In this embodiment, the two photon absorption makes it possible to form structures or optical waveguides 528 in the polymer material 526 (i.e. resin), and then remove the excess, leaving just say the lens system or optical waveguide. This structure will then at the boundary have a high reflective index contrast between the material and air. The alternative method is to write the waveguide or structure and leave the unwritten material in place, this may produce structures with low refractive index contrast.

Figure 9:
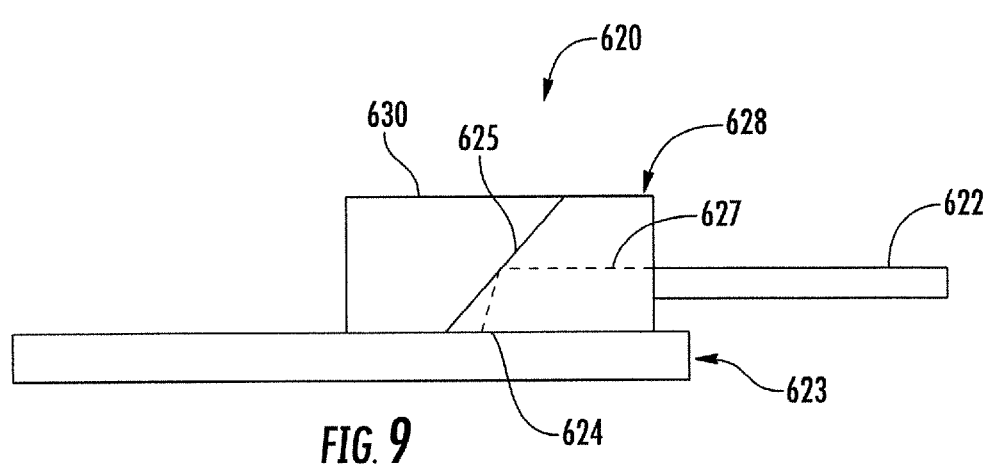
FIG. 9 is a schematic side view of another embodiment of the electro-optic device.

Referring now additionally to FIG. 9, another embodiment of the electro-optic device 20 is now described. In this embodiment of the electro-optic device 20, those elements already discussed above with respect to FIGS. 1-2 are incremented by 600 and most require no further discussion herein. This embodiment differs from the previous embodiment in that this electro-optic device 620 illustratively includes a block 630 comprising the mirror 625. In some embodiments, the mirror 625 may comprise a dichroic mirror. Here, the optical waveguide 628 abuts the block 630. Although not shown, the electro-optic device 620 includes a thin layer of epoxy between the optical waveguide 628 and the block 630. The thin layer of epoxy must be carefully formed so as not to interfere with the reflection of the electromagnetic radiation at the second wavelength. In this embodiment, the optical curing of the optical waveguide 628 would occur before coupling of the block 630.

In this alternative embodiment, as the block 630 containing the mirror 625 is added after the writing of the optical waveguide 628 and/or lens system, the mirror does not need to be dichroic. This alternative embodiment may possibly have the disadvantage in that the additional block is added with epoxy. The thin layer of epoxy may cause variations in the optical path 627 as it is difficult to control precisely. In advantageous dichroic embodiments, the dichroic mirror 625 covers all the material that is exposed by the laser. This is so that there is no abrupt disconnect where the dichroic mirror 625 ends as the mirror (even in transmission), which may cause a shift in the position of the laser beam with respect to air. Accordingly, there will be a "jump" movement of the laser beam as the beam moves across the end of the mirror during the writing. This could in theory be avoided using appropriate software control or more simply by having the mirror cover the entire area written.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An electro-optic device comprising:
    a photonic chip having an optical grating at a surface thereof;
    an integrated circuit (IC) coupled to said photonic chip;
    an optical element defining an optical path above said optical grating;
    a dichroic mirror above said optical grating and aligned with the optical path; and
    a photopolymer polymer material encapsulating said optical element and said dichroic mirror and configured to cure responsive to a first wavelength of electromagnetic radiation;
    said photonic chip configured to operate at a second wavelength range of electromagnetic radiation;
    said dichroic mirror configured to reflect the second wavelength range of electromagnetic radiation and transmit the first wavelength of electromagnetic radiation, the first wavelength being outside the second wavelength range.

2. The electro-optic device of claim 1 wherein said optical element comprises an optical fiber extending parallel with said optical grating.

3. The electro-optic device of claim 1 wherein said optical element comprises a lens.

4. The electro-optic device of claim 3 wherein said lens comprises a collimating lens.

5. The electro-optic device of claim 4 wherein said lens comprises a flat face lens.

6. The electro-optic device of claim 4 wherein said lens comprises a partially curved face lens.

7. The electro-optic device of claim 1 wherein said photopolymer polymer material extends along said photonic chip between opposing ends thereof.

8. The electro-optic device of claim 7 wherein said photopolymer polymer material, when cured, is configured to fix a positional relation between said optical element and said dichroic mirror.

9. An electro-optic device comprising:
    a photonic chip having an optical grating at a surface thereof;
    an integrated circuit (IC) coupled to said photonic chip;
    a mirror above said optical grating and aligned with an optical path above said optical grating;
    an optical waveguide having a first external surface carrying said mirror and a second external surface defining an optical element;
    said photonic chip configured to operate at a wavelength range of electromagnetic radiation;
    said mirror configured to reflect the wavelength range of electromagnetic radiation.

10. The electro-optic device of claim 9 wherein said optical element comprises a lens.

11. The electro-optic device of claim 10 wherein said lens comprises a collimating lens.

12. The electro-optic device of claim 9 further comprising a block abutting the first external surface.

13. The electro-optic device of claim 9 wherein said mirror comprises a dichroic mirror.

14. An electro-optic device comprising:
    a photonic chip having an optical grating at a surface thereof;
    an integrated circuit (IC) coupled to said photonic chip;
    a mirror above said optical grating and aligned with an optical path above said optical grating; and
    an optical element;
    an optical waveguide having a first external surface carrying said mirror and a second external surface adjacent said optical element;
    said photonic chip configured to operate at a wavelength range of electromagnetic radiation;
    said mirror configured to reflect the wavelength range of electromagnetic radiation.

15. The electro-optic device of claim 14 wherein said optical element comprises an optical fiber extending parallel with said optical grating.

16. The electro-optic device of claim 14 wherein said optical element comprises a lens.

17. The electro-optic device of claim 16 wherein said lens comprises a collimating lens.

18. The electro-optic device of claim 16 wherein said lens comprises a flat face lens.

19. The electro-optic device of claim 16 wherein said lens comprises a partially curved face lens.

20. The electro-optic device of claim 14 wherein said mirror comprises a dichroic mirror.

* * * * *